United States Patent [19]

Miyashita et al.

[11] Patent Number: 4,641,884
[45] Date of Patent: Feb. 10, 1987

[54] SEAT FOR VEHICLES

[75] Inventors: Norio Miyashita, Tokyo; Akira Nemoto, Akishima, both of Japan

[73] Assignees: Honda Giken Kogyo Kabushiki Kaisha; Tachikawa Spring Co. Ltd., both of Tokyo, Japan

[21] Appl. No.: 831,272

[22] Filed: Feb. 20, 1986

[30] Foreign Application Priority Data

Feb. 21, 1985 [JP] Japan ................ 60-33326

[51] Int. Cl.$^4$ .................................. A47C 3/00
[52] U.S. Cl. .................... 297/284; 297/362; 297/367
[58] Field of Search ........... 297/284, 362, 366, 367, 297/379

[56] References Cited

U.S. PATENT DOCUMENTS

| 336,387 | 2/1886 | Child | 297/284 |
|---|---|---|---|
| 3,333,891 | 8/1967 | Werner et al. | 297/367 |
| 3,540,777 | 11/1970 | de Beaumont | 297/284 |
| 4,113,308 | 9/1978 | Werner et al. | 297/362 |
| 4,234,228 | 11/1980 | Flamm | 297/284 |
| 4,437,703 | 3/1984 | Nishikori et al. | 297/362 |
| 4,457,557 | 7/1984 | Une | 297/367 X |

Primary Examiner—Francis K. Zugel
Attorney, Agent, or Firm—Hill, Van Santen, Steadman & Simpson

[57] ABSTRACT

A seat for a vehicle in which a seat back is separated into a plurality of portions in the vertical direction and a reclinable angle of each of the plurality of separated portions can be varied is disclosed, which includes a reclining device provided in connection with the lowest portion of the separated portions and a cushion of the seat for adjusting a reclinable angle of the lowest portion relative to the cushion of the seat, a plurality of angle adjusting devices each provided in connection with adjacent ones of the separated portions for adjusting an angle of an upper portion of the adjacent ones relative to a lower portion thereof, a fine adjusting member provided in connection with each of the plurality of angle adjusting devices for finely adjusting the angle of the upper portion, a member for coupling each of the plurality of angle adjusting devices to the reclining device to thereby operate the plurality of angle adjusting devices in response to each operation of the reclining device, whereby the separated portions can be varied to various reclinable postures and the reclined postures of the separated portions can be adjusted finely.

20 Claims, 13 Drawing Figures

SEAT FOR VEHICLES

BACKGROUND OF THE INVENTION

1. Field of the Invention

This invention relates generally to a seat for vehicles, and more particularly to a reclinable seat arrangement of the type which is especially suitable for use as a motor vehicle seat and the like.

2. Description of the Prior Art

There is already known a motor vehicle seat, particularly an individual vehicle seat, which generally speaking, includes a reclining device for adjustably varying an inclined angle of a seat back so that the user can vary his final posture on the vehicle seat. This conventional vehicle seat, however, can adjust the reclinable angle of the seat back only by reclining the seat back so that when the seat back is placed in its normal state, the surface of the seat back is fitted along the whole surface of the user's back, while when the reclinable angle of the seat back is increased, a clearance or spacing is caused between the upper portion of the user's back and the surface of the seat back. This makes such conventional seat uncomfortable to sit on. Hence the user cannot maintain a stable final posture and felt being fatigued easily.

Therefore, there is also proposed a so-called multi-joint type seat which comprises a plurality of separated seat backs and angle adjusting mechanisms attached to the respective coupled portions of the above separated seat backs wherein the whole surfaces of the seat backs can be fitted well to whole of the user's back by varying the inclined angles of the above mentioned separated portions. While this conventional multi-joint seat enables the user to take a comfortable final posture in accordance with his physique or taste, the angles of the respective separated portions of the seat are adjusted independently so that the adjusting operation becomes very cumbersome. Also when the seat back is returned to the original position or when the angles of the respective separated portions are adjusted to be desired ones, they must be adjusted again and thus the adjusting operation becomes troublesome.

OBJECTS AND SUMMARY OF THE INVENTION

Accordingly, it is a general object of the present invention to provide an improved seat for vehicles which can remove the prior art defects.

More particularly, it is an object of the present invention to provide a seat for vehicles of a so-called multi-joint type structure in which the inclinatin angles of the respective separated portions can be adjusted independently.

It is further object of the present invention to provide a seat for vehicles in which the states of the respective angle adjusting mechanisms can be varied to a plurality of final postures of a user positively and easily by the operation of a single lever.

It is still further object of the present invention to provide a seat for vehicles which can be simplified in construction.

It is yet further object of the present invention to provide a seat for vehicles which can be manufactured at low cost.

According to one aspect of the present invention, there is provided a seat for vehicles in which a seat back is separated into a plurality of portions in the vertical direction and a reclinable angle of each of said plurality of separated poritons can be varied, comprising:

(a) reclining means provided in connection with the lowest portion of said separated portions and a cushion of said seat for adjusting a reclinable angle of said lowest portion relative to said cushion of said seat;

(b) a plurality of angle adjusting means each provided in connection with adjacent ones of said separated portions for adjusting an angle of an upper portion of said adjacent ones relative to a lower portion thereof;

(c) fine adjusting means provided in connection with each of said plurality of angle adjusting means for finely adjusting the angle of said upper portion; and (d) means for coupling each of said plurality of angle adjusting means to said reclining means to thereby operate said plurality of angle adjusting means in response to each operation of said reclining means, whereby said separated portions can be varied to various reclinable postures and said reclined postures of said separated portions can be adjusted finely.

These and other objects, features and advantages of the present invention will become apparent from the following detailed description of the preferred embodiments taken in conjunction with the accompanying drawings.

DESCRIPTION OF THE PREFERRED EMBODIMENTS

Now, the present invention will hereinafter be described with reference to the attached drawings.

Figure 1:
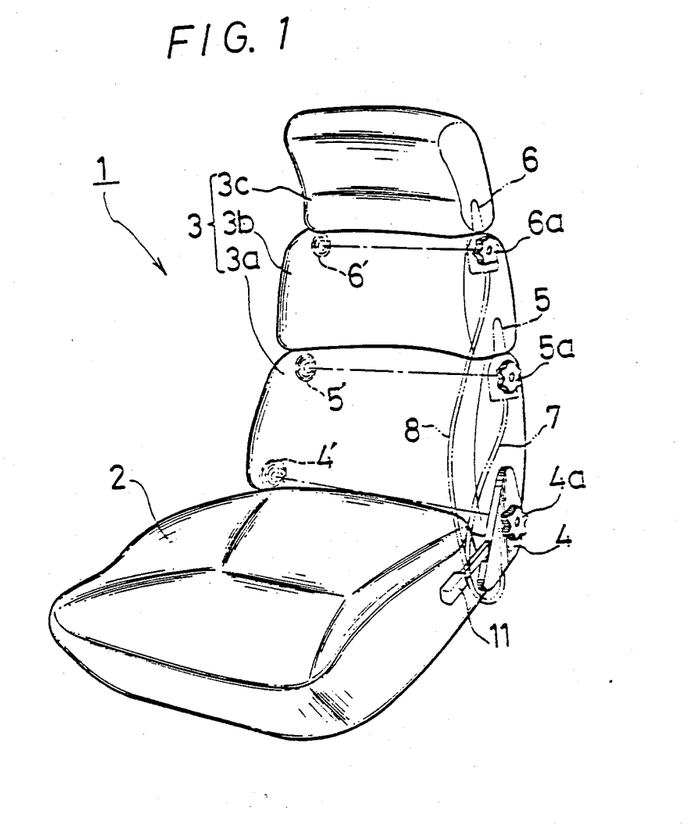
FIG. 1 is a perspective view showing one example of a seat for vehicles to which the present invention is applied.

In FIG. 1, reference numeral 1 designates an overall arrangement of a vehicle seat, reference numeral 2 designates a seat cushion and reference numeral 3 designates a seat back. The seat back 3 is separated by three in the up and down or vertical direction, or it is separated into three portions, i.e., a lower portion 3a corresponding to a lumbar vertebra of a user's back, an intermediate portion 3b corresponding to an upper half portion of the user's back and an upper portion 3c prepared as a head restraint. A first angle adjusting mechanism 4 is provided at one side of a coupling portion between the lower portion 3a of the seat back 3 and the seat cushion 2; a second angle adjusting mechanism 5 is provided on a coupling portion between the lower portion 3a and the intermediate portion 3b at the same side as the former and a third angle adjusting mechanism 6 is provided on a coupling portion between the intermediate portion 3b and the head restraint 3c at the same side as the former, respectively. The first angle adjusting mechanism, that is, the reclining device 4 is coupled with the second and third angle adjusting mechanisms 5 and 6 through control wires 7 and 8 so that the second and third angle adjusting mechanisms 5 and 6 are respectively operated by the operation of a lever 11 of the reclining device 4. The reclining device 4 and the second and third angle adjusting mechanisms 5 and 6 are provided with fine adjusting knobs 4a, 5a and 6a, respectively. To the other sides of the lower portion 3a, the intermediate portion 3b and the upper portion 3c, there are respectively provided return springs 4', 5' and 6' in correspondence with the reclining device 4 and the second and third angle adjusting mechanisms 5 and 6 thereby to always rotatably bias the respective portions 3a, 3b and 3c in the forward direction.

Figure 2A:
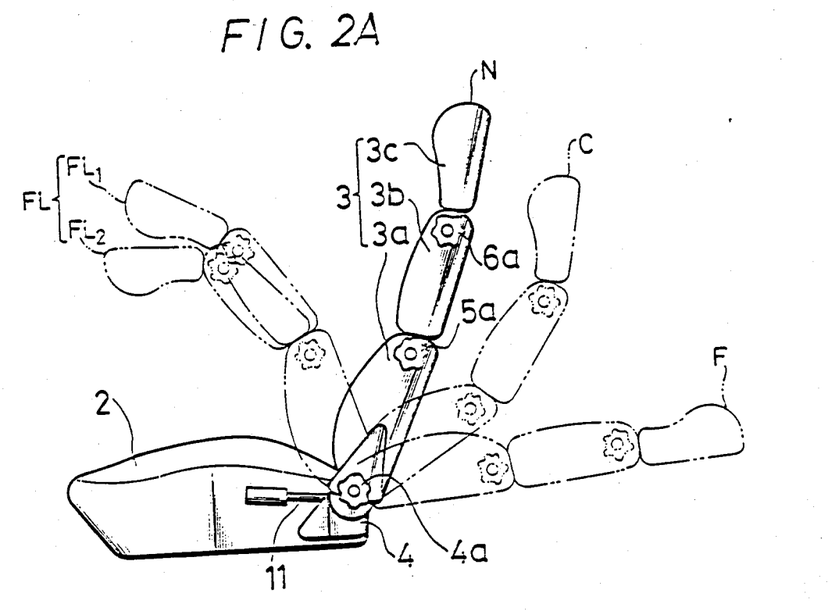
FIG. 2A is a side view showing the operated state of the seat shown in FIG. 1.
Figure 2B:
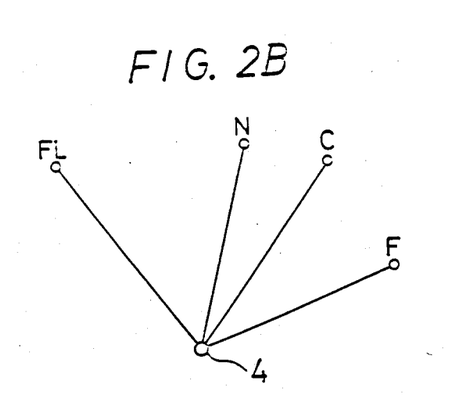
FIGS. 2B and 2C are respectively diagrams used to explain the like operation state.
Figure 2C:
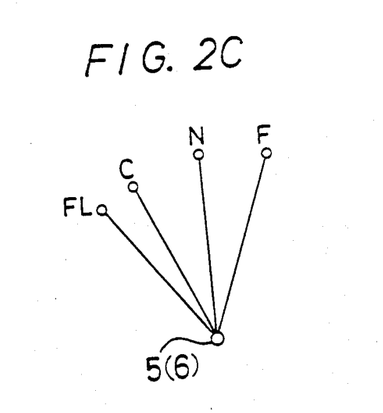
Figure 3:
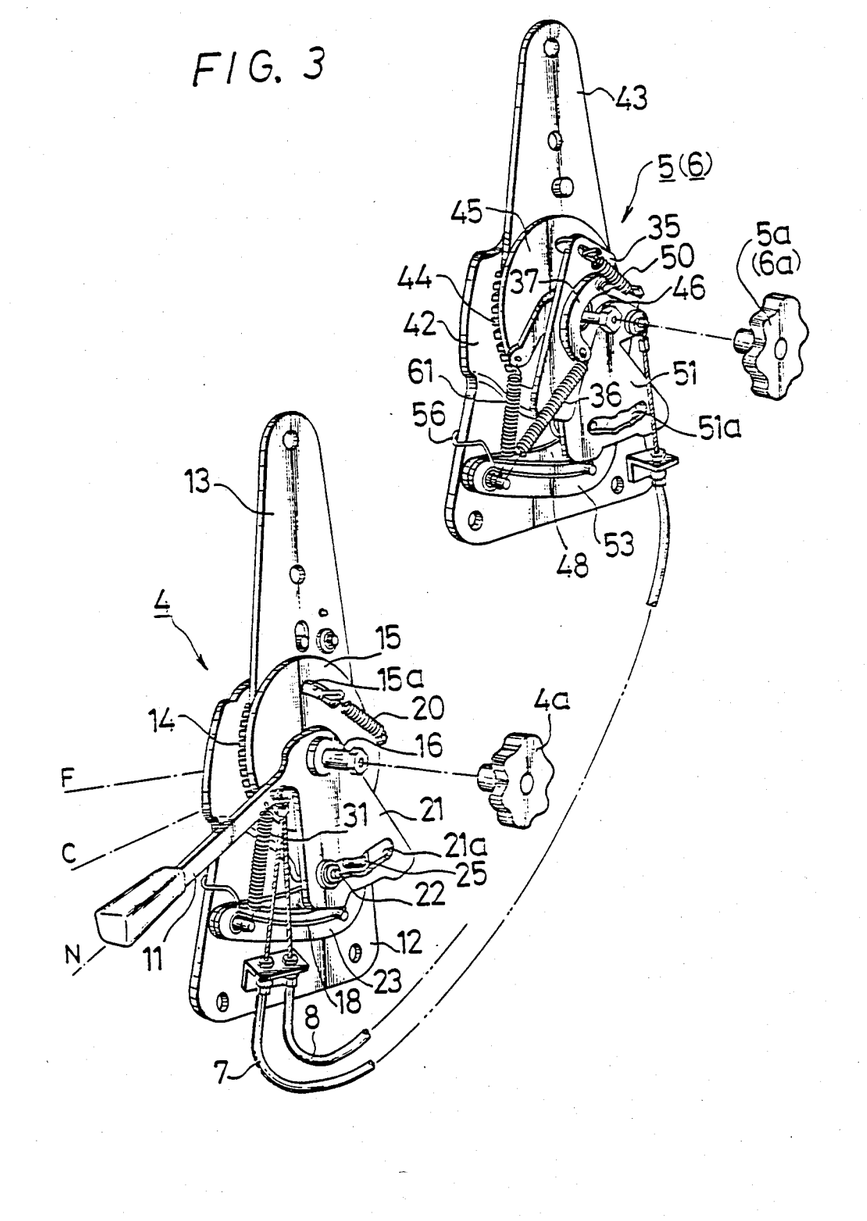
FIG. 3 is a partly-omitted perspective view showing one example of an angle adjusting mechanism according to the present invention.

The thus constructed seat back 3 can be placed at a first forward-leaning position $FL_1$ (reclinable position in the forward direction and hereinafter simply referred to as $FL_1$), a second forward-leaning position $FL_2$ (reclinable position in the forward direction and hereinafter simply referred to as $FL_2$), a neutral position N, a comfortable position C and a full reclining position F relative to the seat cushion 2 as shown in FIG. 2A. The angles of the reclining device 4 and the second and third angle adjusting mechanisms 5 and 6 will be determined as shown in FIGS. 2B and 2C. In this case, the angle of the reclining device 4 can be reclinably moved to the forward-leaning position FL, the neutral position N, the comfortable position C and the full reclining position F in this order as shown in FIG. 2B, while the angles of the second and third angle adjusting mechanisms 5 and 6 can be reclinably moved to the forward-leaning position FL, the comfortable position C, the neutral position N and the full reclining position F in this sequential order as shown in FIG. 2C. To this end, the movable or lift-up of the lever 11 of the reclining device 4 is made as two stages from the locking position (the neutral position N) through a middle stage (the comfortable position C) to the upper stage (the full reclining position F) as shown in FIG. 3, by which the posture of the seat back 3 can be set by the lift-up of the lever 11.

In other words, when the lever 11 of the reclining device 4 is lifted up from the locking position to the middle stage, the posture of the seat back 3 can be varied from the neutral position N to the comfortable position C or the first forward-leaning position $FL_1$, while when the lever 11 is further lifted up to the upper stage, the posture of the seat back 3 can be varied to the full reclining position F or the second forward-leaning position $FL_2$.

The constructions of the respective mechanisms operable as described above will be described in detail with reference to FIGS. 3 to 9.

Figure 4:
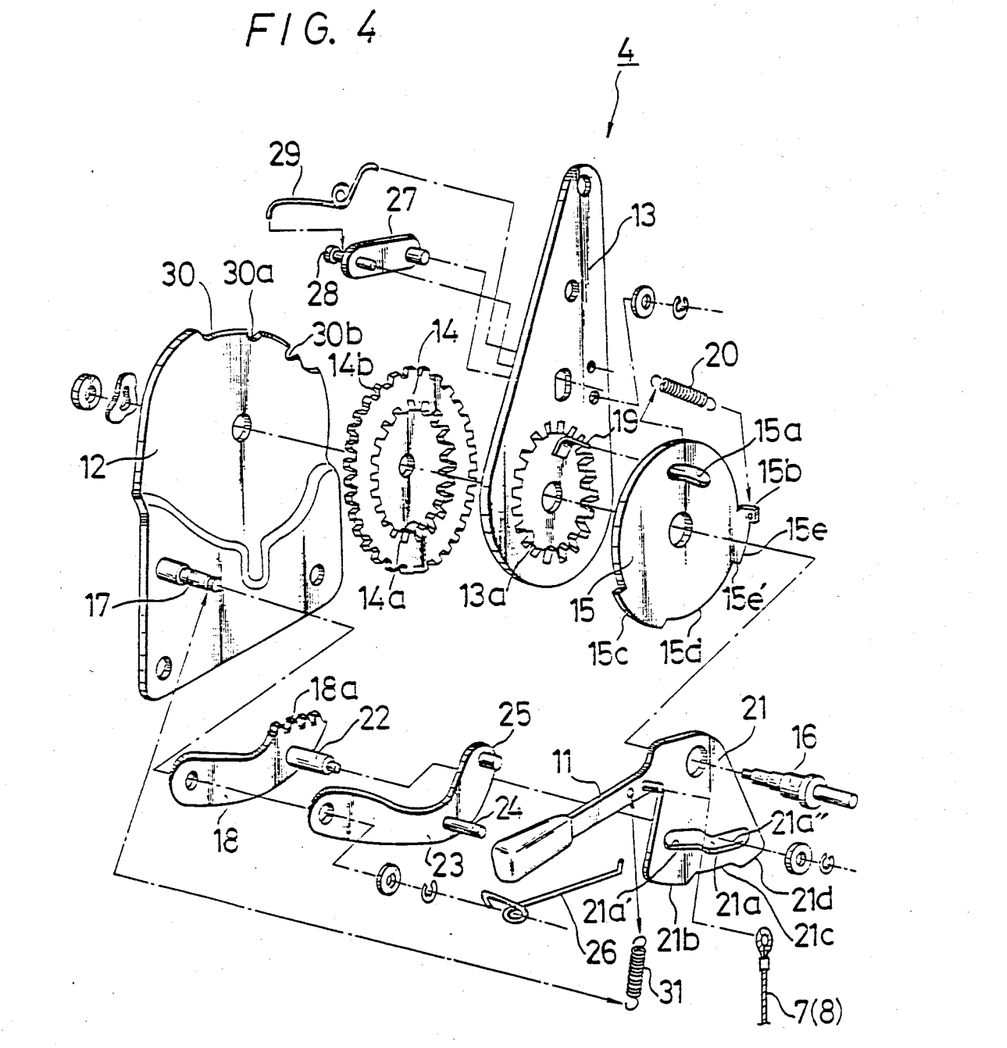
FIG. 4 is an exploded perspective view showing a first angle adjusting mechanism according to the present invention.
Figure 5:
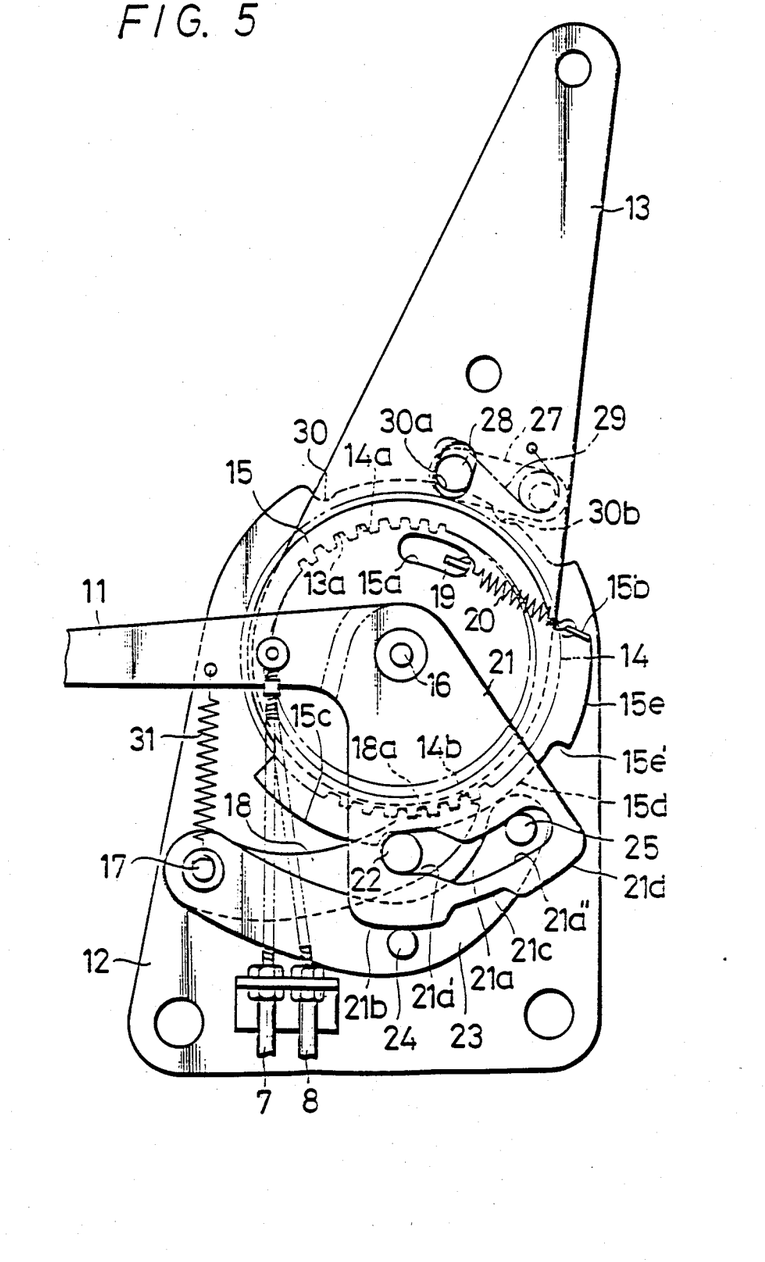
FIG. 5 is a partly-omitted side view of the same angle adjusting mechanism in which it is placed in its neutral state.

In the first place, the first angle adjusting mechanism 4 will be described with reference to FIGS. 4 to 6. The first angle adjusting mechanism, that is, the reclining device 4 comprises a base bracket 12 to be fixed to the cushion frame (not shown) of the seat cushion 2, a movable arm 13 to be fixed to the frame (not shown) of the lower portion 3a of the seat back 3, an intermediate gear 14, an idler 15 and the above mentioned lever 11, each being coaxially and movably assembled by a hinge pin 16. The fine adjusting knob 4a is attached to the tip end of the hinge pin 16. The movable arm 13 has an externally toothed gear annulus 13a (which is projected to the side of the gear 14) and the intermediate gear 14 has an internally toothed gear annulus 14a the number of the teeth of which are more than that of the gear annulus 13a. Thus, the movable arm 13 is of a reclining system of a so-called Taumel type in which the arm 13 is turnable relative to the intermediate gear 14 under the state that the externally toothed gear annulus 13a is meshed with the internally toothed gear annulus 14a in a certain range. When the hinge pin 16 is rotated by the fine adjusting knob 4a, the mutual rotational angle of the arm 13 and the intermediate gear 14 can be varied in a stepless fashion. The intermediate gear 14 forms an externally toothed annulus 14b around its external periphery and the externally toothed annulus 14b is meshed with a tooth portion 18a of a lock gear member 18 which is pivoted to the base bracket 12 by a pin 17 planted thereon.

Through the idler 15, there is bored an arc-shaped long slit or opening 15a with the shaft opening of the idler 15 as the center and into which a protrusion 19 projected from the arm 13 is inserted. Although the arm 13 and the idler 15 are mutually rotatable within the range of this long opening 15a, the arm 13 and the idler 15 are normally engaged with each other under the state that they are always biased to one side by a spring 20 extended or stretched between the protrusion 19 and a small cut-up portion 15b formed at the peripheral edge of the idler 15. The lever 11 is formed integrally with a lock plate 21 and this lock plate 21 forms therethrough a step-shape long slit or opening 21a which is engaged with a lock pin 22 protruded from the free end of the lock gear member 18.

To the shaft pin 17 of the base bracket 12, there is pivoted a selector member 23 coaxial with the lock gear member 18. On the free end portion of the selector member 23, there are planted a first pin 24 and a second pin 25 with a predetermined spacing kept therebetween. Since the selector member 23 is biased upward by a spring 26, the first pin 24 always slidably contacts with the front side, a lower edge convex portion 21b, an intermediate lower edge concave portion 21c and a rear side lower edge convex portion 21d of the lock plate 21, while the second pin 25 is in slidable contact with a front convex portion 15c and an intermediate concave portion 15d of the peripheral edge of the idler 15 at its lower edge in accordance with the lifted-up amount of the lever 11.

To the arm 13, there is pivotably attached a knock member 27 so as to become turnable. From the top of the knock member 27, there is projected a knock pin 28 which is biased by a spring 29 to come in slidable contact with an engaging portion 30 formed on the upper peripheral edge of the base bracket 12. On the engaging portion 30 of this base bracket 12, there are formed engaging concave portions 30a and 30b with a predetermined spacing kept therebetween. The lever 11 is always biased downward by a lock spring 31.

The operation of the first angle adjusting mechanism, i.e., the reclining device 4 constructed as described above will be described. First of all, the operation to move the reclining device 4 from the neutral position N (FIG. 5) to the forward-leaning position FL (FIG. 6) and again from the forward-leaning position FL to the neutral position N will be explained.

Figure 6:
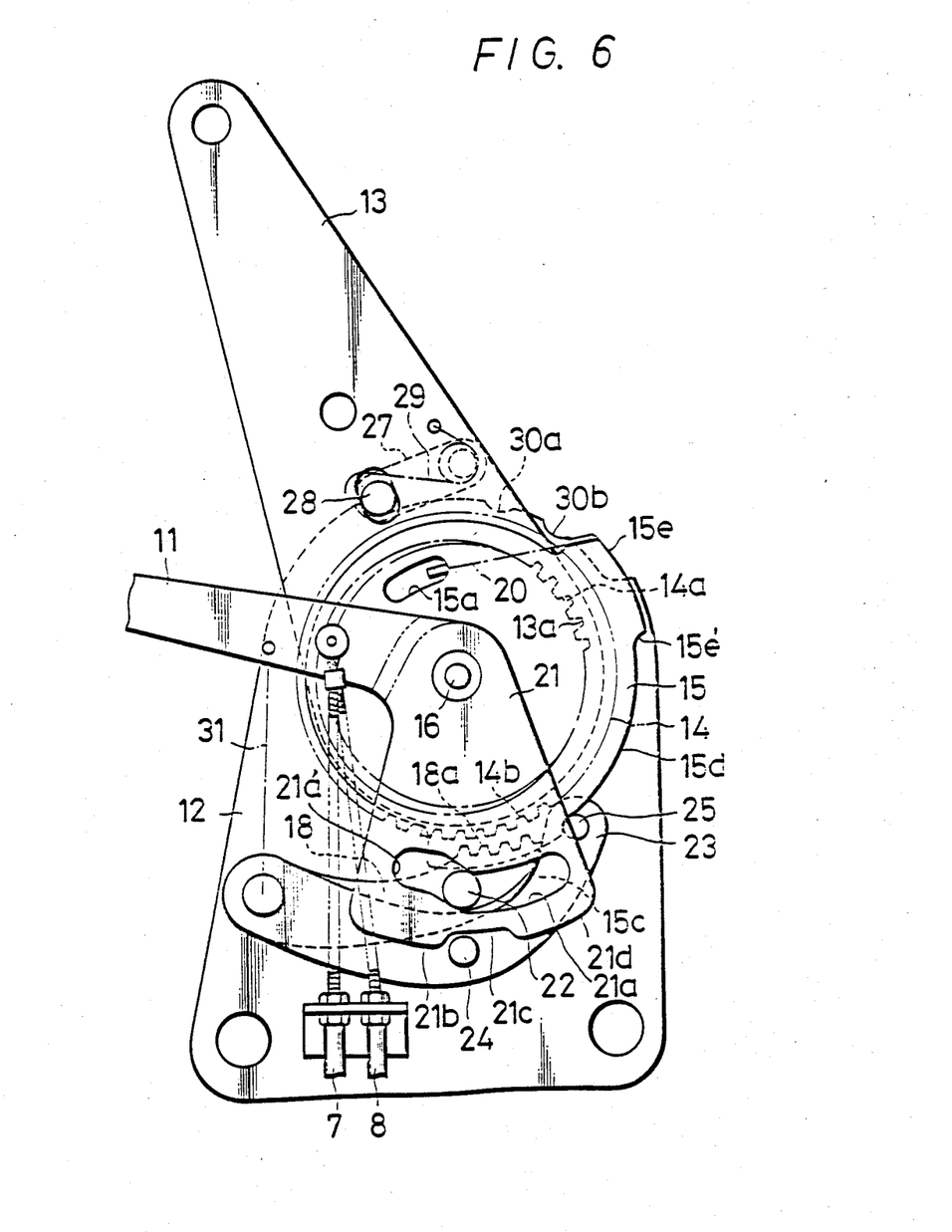
FIG. 6 is a partly-omitted side view of the same angle adjusting mechanism in which it is placed in the forward-leaning state.
Figure 7:
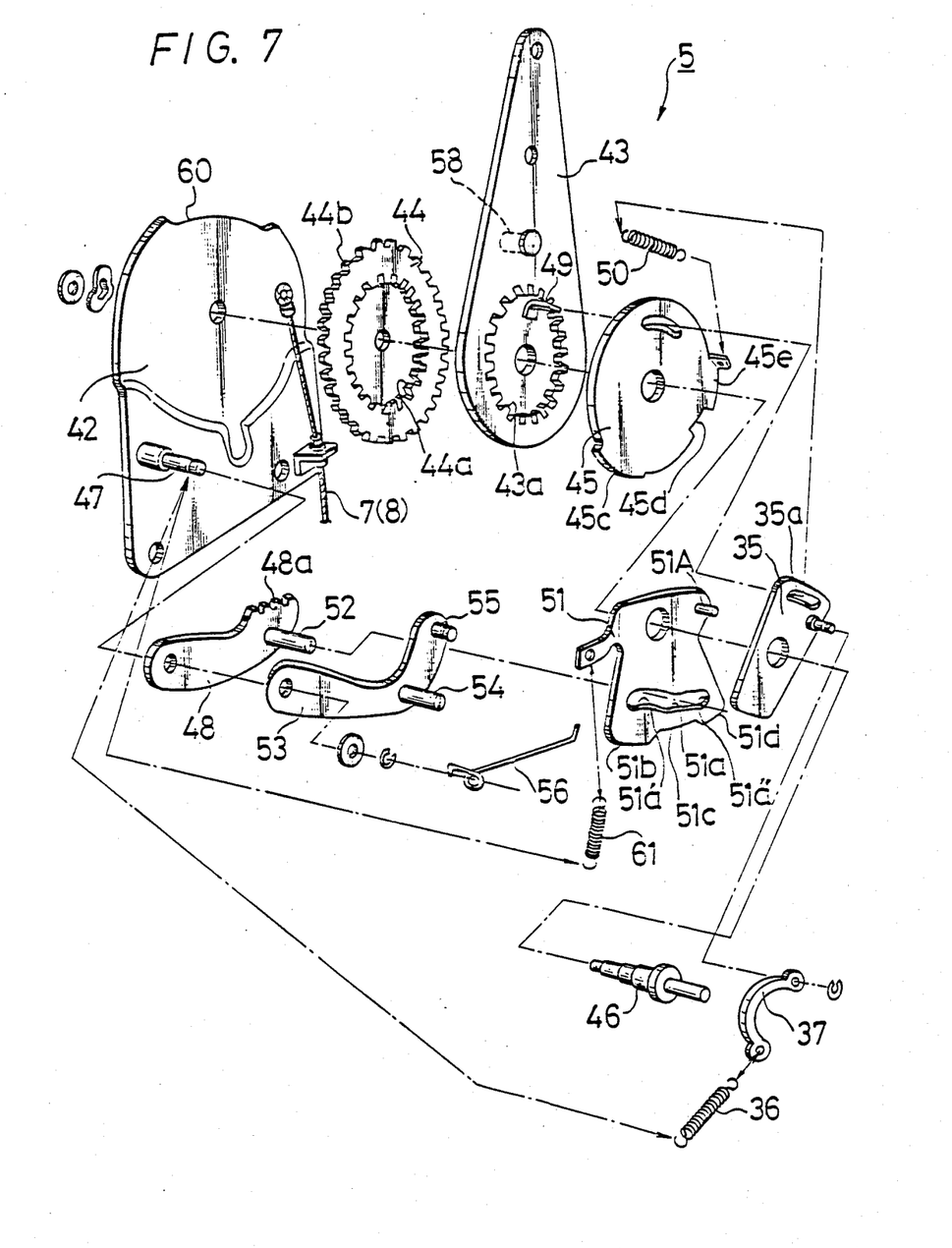
FIG. 7 is an exploded perspective view illustrating one example of a second angle adjusting mechanism according to the present invention.

When the lever 11 is lifted up from the neutral position N to the middle stage or comfortable position C (refer to FIG. 3), as shown in FIG. 6, the long opening 21a of the lock plate 21 pushes down the lock pin 22 planted on the lock gear member 18 to an inclined portion between an upper stepped portion 21a' and a lower stepped portion 21a" of the opening 21a with the result that the lock gear member 18 is rotated to thereby disengage the top tooth portion 18a thereof from the intermediate gear 14, thus releasing the locked state of the arm 13 and so on. Under this state, the arm 13, the idler 15 and the intermediate gear 14 are rotatably leaned together in the forward direction. Under this forward-leaning state, since the front convex portion 15c of the idler 15 pushes down the lock pin 22 engaged with the opening 21a of the lock plate 21, the lever 11 can be prevented from being returned to the original condition, maintaining the lock-released state. Under this state, however, if the arm 13 is rotated in its erecting direction, that is, in the clockwise direction, the front convex portion 15c of the idler 15 is disengaged from the lock pin 22 so that the lever 11 is returned to the original position, thus the lever 11 being locked again at the neutral position N.

Next, the operation to move the seat back 3 from the neutral position N to the comfortable position C will be described.

When the lever 11 is lifted up to the middle stage position, the engagement between the externally toothed annulus 14b of the intermediate gear 14 and the tooth portion 18a of the lock gear member 18 is released as described above, while under this state, the first pin 24 on the selector member 23 is made corresponding to the center of the intermediate concave portion 21c of the lock plate 21, so that the selector member 23 is rotated upward by the spring force of the spring 26 to thereby make the second pin 25 formed at the tip end of the selector member 23 contact with the intermediate convex portion 15d of the idler plate 15 (FIG. 6).

Then, when the arm 13 is leaned backward, the second pin 25 of the selector member 23 is abutted with the end portion of the intermediate convex portion 15d of the idler 15, that is, a stepped portion 15e' formed between the intermediate concave portion 15d and the rear convex portion 15e, thus the arm 13 being restrained from leaning backward more than ever. If under this state the lever 11 is released, the lever 11 is returned to the original position by the spring force of the lock spring 31 so that the upper stepped portion 21a' of the long opening 21a bored through the lock plate 21 is engaged with the lock pin 22 of the lock gear member 18, rotating the lock gear member 18 upwards to thereby engage the tooth portion 18a formed at the tip end thereof with the externally toothed annulus 14b of the intermediate gear 14. Therefore, the arm 13 is locked at the comfortable position C.

Thirdly, the operation to move the seat back 3 from the neutral position N to the full reclining position F or from the comfortable position C to the full reclining position F will be described.

When the lever 11 is lifted up to the upper stage, the first pin 24 formed on the selector member 23 pushes down the rear convex portion 21d of the lock plate 21 and the selector member 23 is rotated downward against the biasing force of the spring 26, thus the second pin 25 formed on the tip end of the selector member 23 being prevented from contacting with the peripheral edge of the idler 15. On the other hand, since the lock pin 22 is lowered by the lower stepped portion 21a" of the long opening 21a of the lock plate 21, the lock gear member 18 is rotated downward to thereby disengage the toothed portion 18a formed at the top of the lock gear member 18 from the externally toothed annulus 14b of the intermediate gear 14 so that the arm 13 becomes able to rotate. Therefore, the arm 13 or seat back 3 can be rotated up to the full reclining position F. Thus, if the lever 11 is released, the arm 13 is locked at the full reclining position F similarly as described above.

Further, when the arm 13 or seat back 3 is returned from this full reclining position F to the original neutral position N, the lever 11 is lifted up to thereby rotate the lock gear member 18 through the lock pin 22 so that the toothed portion 18a at the tip end of the lock gear member 18 is disengaged from the externally toothed annulus 14b of the intermediate gear 14. Then, under the state that the arm 13 is released from the locked state, the arm 13 is rotated in the erecting direction.

In this case, the arm 13 can automatically be rotated in the erecting direction by the biasing force of the return spring 4' which is mounted on the other side of the pivot portion of the lower portion 3a at the seat back 3 in opposing relation to the reclining device 4. Further, when the arm 13 is erected from the backward, the comfortable position C and the neutral position N can be sensed by the resistive force generated by the engagement between the knock pin 28 of the knock member 27 and the engaging concave portions 30a and 30b of the engaging portion 30 of the base plate 12.

Subsequently, the constructions of the second and third angle adjusting mechanisms 5 and 6 will be described. In this case, since both of them are constructed in the same way, only the second angle adjusting mechanism 5 will be explained for simplicity with reference to FIGS. 7 to 9.

While the second angle adjusting mechanism 5 is fundamentally constructed in the same way as the first angle adjusting mechanism, that is, the reclining device 4, the angle of the arm 13 in the reclining device 4 is determined unlike the sequential order of the forward-leaning position FL, the neutral position N, the comfortable position C and the full reclining position F (FIG. 2B) but the angle of the corresponding arm is determined in the sequential order of the forward-leaning position FL, the comfortable position C, the neutral position N and the full reclining position F (FIG. 2C). Accordingly, the second angle adjusting mechanism 5 is additionally provided with members, such as a neutral plate member 35, a pull spring 36 and a hook 37 for the purpose of locking the corresponding arm at the neutral position N from the forward-leaning position FL skipping over the comfortable position C.

Although this neutral plate member 35 is rotated around a hinge pin 46 by the rotational amount corresponding to the dimensional difference between a long slit or opening 35a bored through the neutral plate member 35 and a patch 49 of an arm 43 which is attached to the frame (not shown) of the intermediate poriton 3b of the seat back 3, the neutral plate member 35 is normally biased in the backward direction by the pull spring 36.

A lock plate 51 is coupled to the lever 11 of the first angle adjusting mechanism, namely, the reclining device 4 through the control wire 7, one end of which is pivoted to the lever 11 and the other end of which is pivoted to a pin 51A planted on the lock plate 51, and thereby operated by the operation of the lever 11.

The operation of the second angle adjusting mechanism 5 thus constructed will be described. In the first place, an explanation will be given on a case in which the arm 43 or intermediate portion 3b of the seat back 3 is moved from the neutral position N (FIG. 9) to the comfortable position C and is then returned to the neutral position N again and a case in which the arm 43 is moved from the neutral position N to the forward-leaning position FL (FIG. 9) and is then returned to the neutral position N once again.

Figure 8:
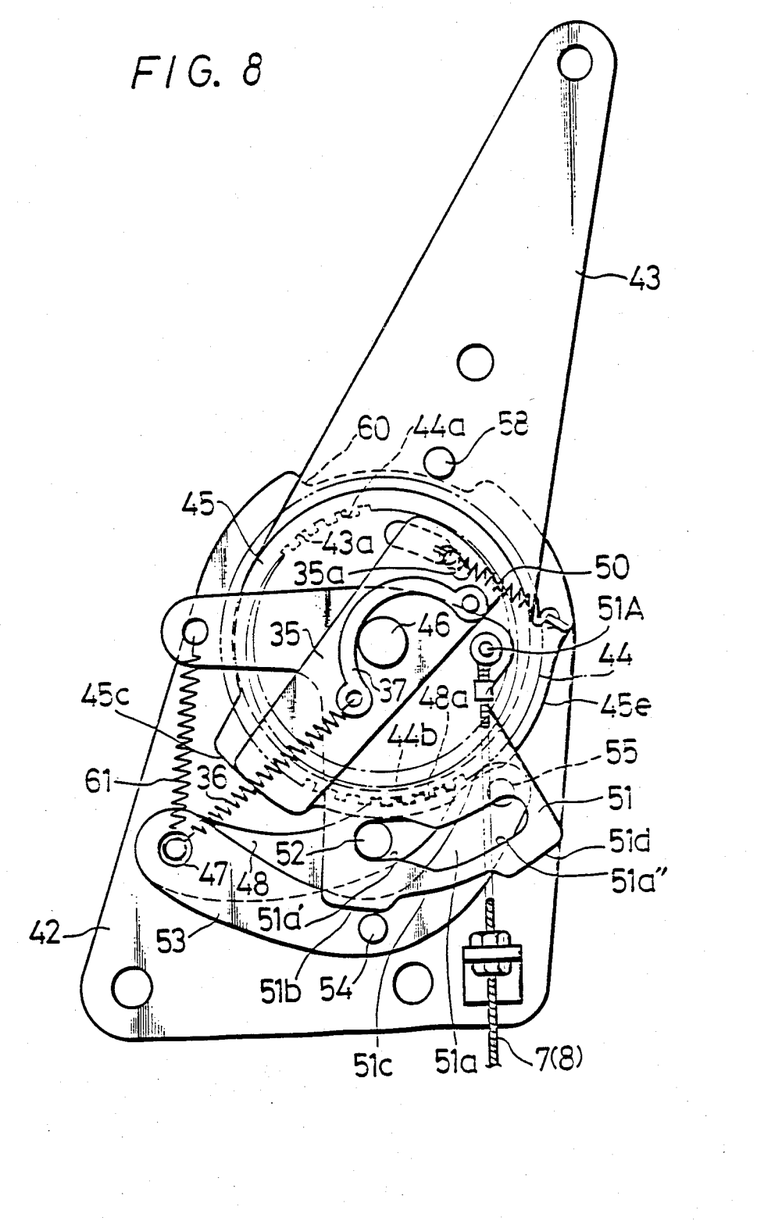
FIG. 8 is a side view of the second angle adjusting mechanism in which it is placed in its neutral position.
Figure 9:
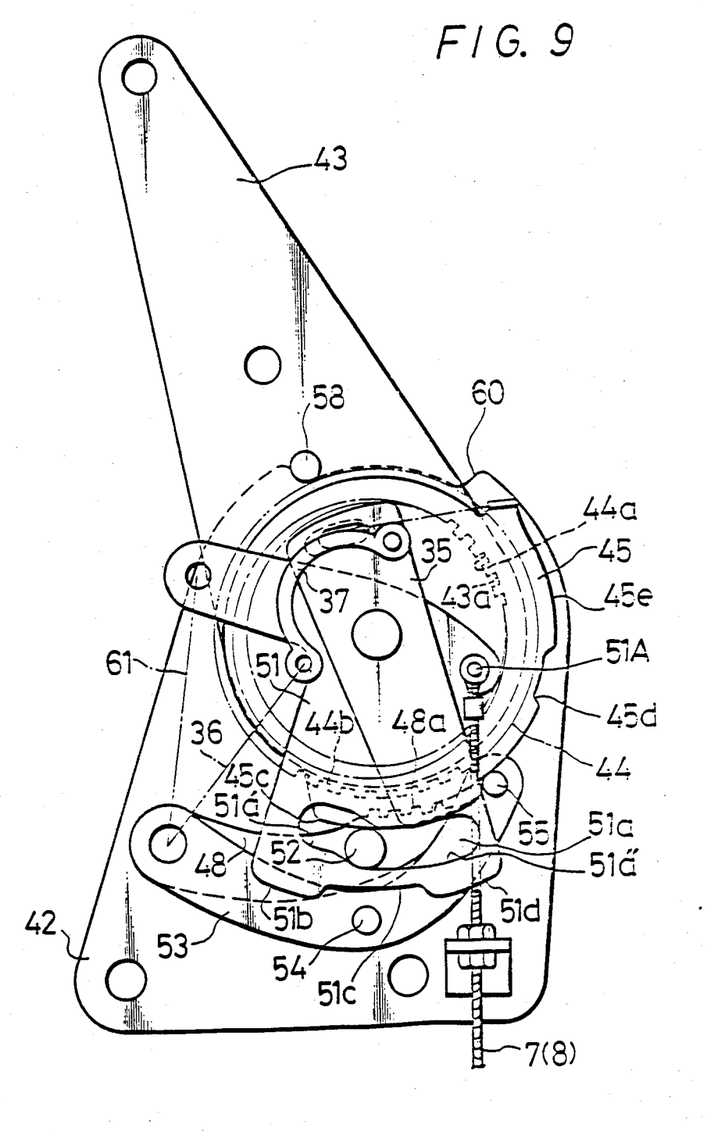
FIG. 9 is a partly-omitted side view of the second angle adjusting mechanism in which it is placed in its forward-leaning state.

When the lever 11 of the first angle adjusting mechanism, i.e., the reclining device 4 is lifted up to the intermediate stage C (FIG. 3), by the control wire 7, the lock plate 51 of the second angle adjusting mechanism 5 under the state shown in FIG. 8 is rotated to the intermediate position and its long slit or opening 51a urges a lock pin 52 planted on a lock gear member 48 to the inclined portion between an upper stepped portion 51a' and a lower stepped portion 51a'' of the opening 51a so that the lock gear member 48 is lowered. Therefore, a toothed portion 48a formed at the tip end of the lock gear member 48 is disengaged from an externally toothed annulus 44b of an intermediate gear 44, thus releasing the arm 43 and so on from the locked state. Then, the arm 43, the intermediate gear 44, an idler 45 and the neutral plate member 35 are integrally leaned in the forward direction. This leaning in the forward direciton can be automatically carried out as the intermediate portion 3b of the seat back 3 is inclined by the biasing force of the return spring 5' mounted on the other end portion of the pivot portion of the intermediate portion 3b on the seat back 3 in accordance with the second angle adjusting mechanism 5. At that time, a first pin 54 planted on the selector member 53 slidably contacts with a lower edge concave portion 51c of the lock plate 51, while a second pin 55 plated on the selector member 53 at its tip end slidably contacts with an outer peripheral concave portion 45d of the idler 45. Under this state, when the arm 43 is rotated forward and the pin 55 at the tip end of the selector member 53 is engaged with the rear end portion of the outer peripheral concave portion 45d of the idler 45 so that the rotation of the arm 43 is restricted.

When the lever 11 of the reclining device 4 is lifted up to the upper stage, the lock plate 51 is rotated to the final position to allow the intermediate pin 54 of the selector member 53 to be slidably pushed by the rear convex edge portion 51d of the lock plate 51 so that the selector member 53 is rotated and the pin 55 formd at the top thereof slidably contacts with an outer peripheral front side portion 45c of the idler 45 over its outer peripheral concave portion 45d, thus the arm 43 being rotated to the forward-leaning position FL. At that time, the neutral plate member 35 is pulled by the pull spring 36 through the hook 37 and thereby rotated in the forward direction. Under this forward-leaning state, a front convex edge portion 45c of the idler 45 pushes down the lock pin 52 of the lock gear member 48 so as to sandwich the same between the portion 45c and the long opening 51a of the lock plate 51, so that the lock plate 51 is not returned to the original position but keeps the lock releasing state (see FIG. 9).

If under this forward-leaning state the arm 43 is lifted upward gradually, the lower edge concave portion 45d of the idler 45 is made corresponding to the pin 55 formed on the top of the selector member 53 (the neutral position N of the second angle adjusting mechanism 5). If the arm 43 is further leaned backward, the rear end of the lower edge concave portion 45d of the idler 45 is engaged with the pin 55 projected at the tip end of the selector member 53 to thereby push the lower portion 3a of the seat back 3 in the backward direction. Therefore, the arm 13 of the reclining device 4 is erected from the forward-leaning state to the neutral position N and can be locked as described above. Since this reclining device 4 is locked, the control wire 7 is returned to the original condition and the second angle adjusting mechanism 5 is locked. In other words, the second angle adjusting mechanism 5 is again locked at the neutral position N.

Next, an explanation will be given on the operation of the second angle adjusting mechanism 5 in which the seat back 3 is moved from the neutral position N to the full reclining position F or from the comfortable position C to the full reclinging position F.

When the lever 11 of the reclining device 4 is lifted up to the upper stage, the lock plate 51 of the second angle adjusting mechanism 5 is rotated to the final position so that as described above, the long opening 51a of the lock plate 51 pushes down the lock pin 52 of the lock gear member 48 to thereby disengage the toothed portion 48a formed on the tip end of the lock gear member 48 from the externally toothed annulus 44b of the intermediate gear 44. Thus, the locked state is released so that the arm 43 can be leaned to the full reclining position F.

In this case, the lock plate 51 must be rotated to the final position otherwise the tip end pin 55 of the selector member 53 is engaged with the rear end of the lower edge concave portion 45d of the idler 45 so that the arm 43 can not be leaned to the full reclining position F.

In other words, if the lock plate 51 is rotated to the final position, the rear convex edge portion 51d of the lock plate 51 pushes down the intermediate pin 54 of the selector member 53 to thereby rotate the selector member 53 downward so that its tip end pin 55 is disengaged from the lower edge concave portion 45d of the idler 45, thus the arm 43 can be leaned freely.

Under the state that the arm 43 is leaned down to the full reclining position F, if the lever 11 of the reclining device 4 is released, the reclining device 4 is locked and also the control wire 7 is returned to the original position, whereby the lock plate 51 is rotated to the original position to thereby place the second angle adjusting mechanism 5 in the locked state. By rotating the fine adjusting knob 5a, the arm 43 is rotated under the state that the engagement range of the internally toothed gear annulus 43a of the intermediate gear 44 relative to its externally toothed gear annulus 44a is being changed, thus to vary the inclined angle of the arm 43. In other words, it is possible to finely adjust the inclined posture of the intermediate portion 3b of the seat back 3 by rotating the fine adjusting knob 5a. In this case, the inclinable and turnable range of the arm 43 is restricted by the engagement between a pin 58 projected on the arm 43 and an engaging concave portion 60 formed on the upper edge of the base plate 42.

Another embodiment of the second and third angle adjusting mechanism 5 and 6 according to the present invention will hereinafer be described with reference to FIGS. 10 and 11.

Also in this embodiment, the second and third angle adjusting mechanisms 5 and 6 are constructed in exactly the same way so that an explanation will be given only on the second angle adjusting mechanism 5 for simplicity.

In this embodiment, the aforesaid second angle adjusting mechanism 5 is simplified in mechanism by omitting the idler 45 and the neutral plate member 35 used in the above embodiment.

Figure 10:
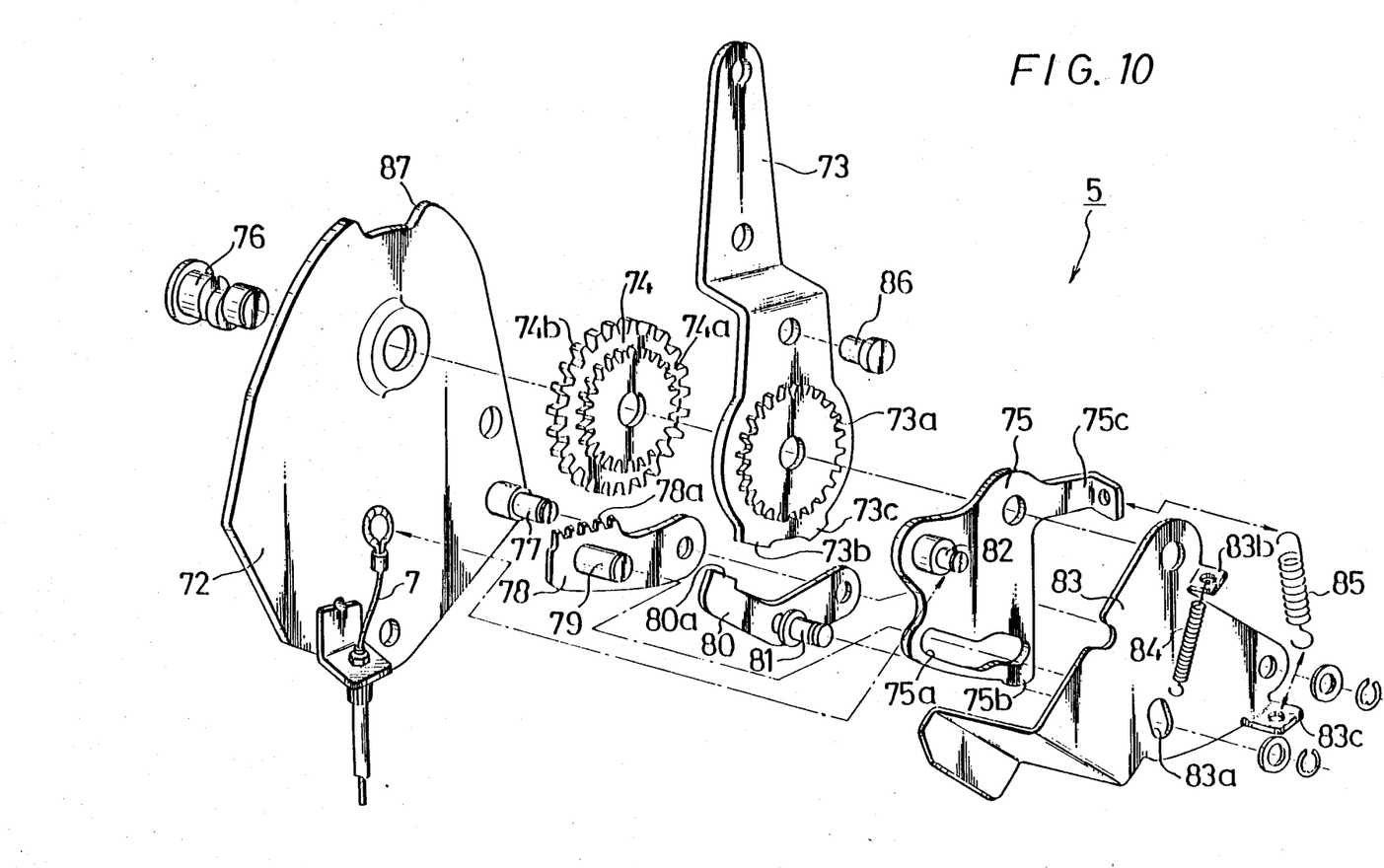
FIG. 10 is an exploded perspective view illustrating another embodiment of the second angle adjusting mechanism according to the present invention.
Figure 11:
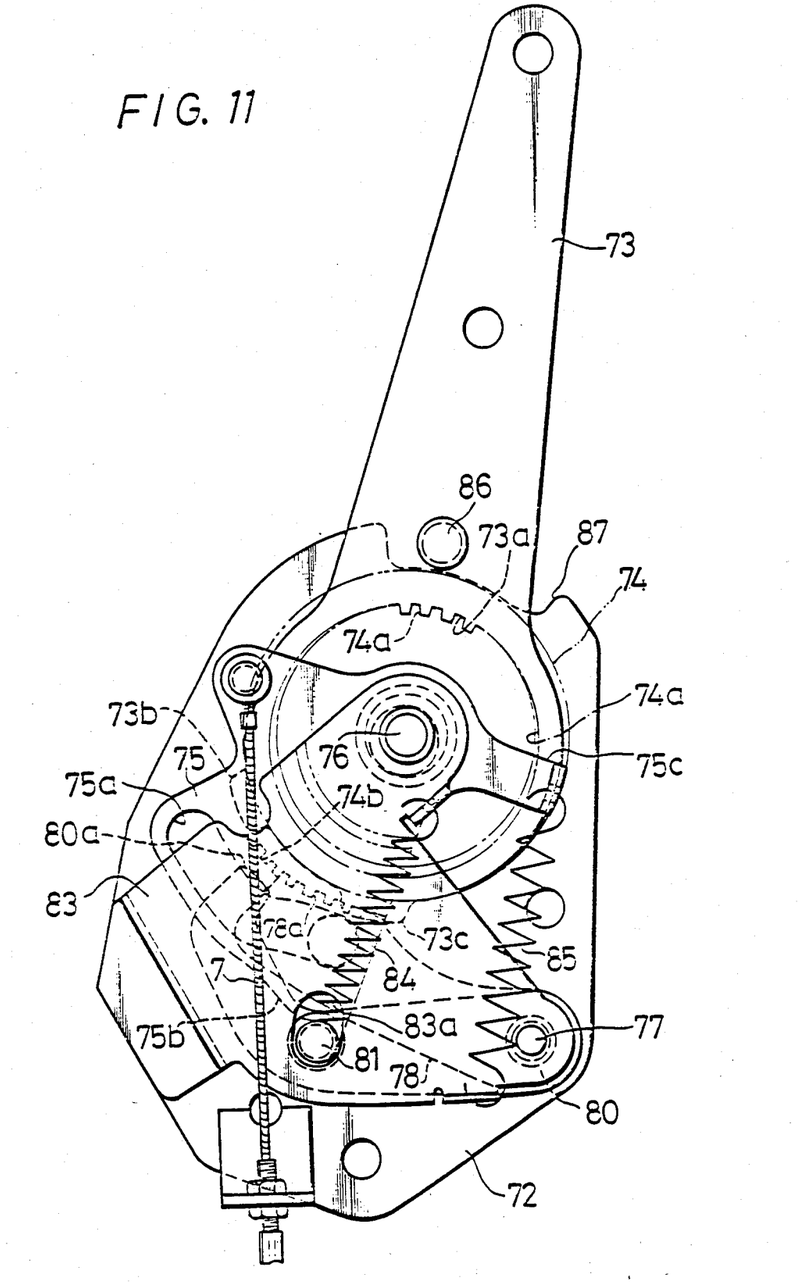
FIG. 11 is a side view thereof.

In this embodiment, as shown in FIGS. 10 and 11, the second angle adjusting mechanism 5 mainly comprises a base bracket 72, an arm 73, an intermediate gear 74 and a lock plate 75, each of these main members being assembled by a hinge pin 76 coaxially. The arm 73 is formed thereon an internally toothed gear annulus 73a with the bore for the pin 76 as the center, while the intermediate gear 74 is formed with an externally toothed gear annulus 74a which is less in the number of the teeth than the internally toothed gear annulus 73a of the arm 73. The internally toothed gear annulus 73a and the externally toothed gear annulus 74a are engaged with each other in a part of a range under being eccentric state and due to the difference in the number of teeth therebetween and are adaped to carry out the mutual rotational movement, wherein the angles of the arm 73 and the intermediate gear 74 can be varied from each other by the rotation of the hinge pin 76 in a stepless fashion.

With the externally toothed annulus 74b formed around the outer periphery of the intermediate gear 74, there is engaged a tip end toothed portion 78a of a lock gear member 78 which is pivoted on a shaft pin 77 implanted on the base bracket or base plate 72. A lock pin 79 is planted on the lock gear member 78 and a selector member 80 is pivotably supported on the shaft pin 77 on which the lock gear member 78 is pivotably supported. A pin 81 is planted on the intermediate portion of this selector member 80, and a tip end portion 80a of the selector member 80 is made corresponding to convex edge portions 73b and 73c which are separately formed on the front and rear of the lower side peripheral edge of the arm 73.

Through the lower portion of the lock plate 75, there is formed a stepped elongated slit or opening 75a with which the lock pin 79 implanted on the lock gear member 78 is engaged. On the upper portion of the lock plate 75, there is implanted a pin 82 to which is pivotally coupled the tip end of the control wire 7 connected to the lever 11 of the reclining device 4. The pin 81 of the selector member 80 slidably contacts with the lower edge portion of the lock plate 75 in which a convex edge portion 75b is formed on the rear portion thereof. An outer surface plate 83 is located at the outer side surface of this lock plate 75 and this outer surface plate 83 is fixed to the base plate 72. Through this outer surface plate 83, there is formed a long slit or opening 83a which is to be engaged with the tip end portion of the pin 81 of the selector member 80. Between the tip end portion of the pin 81 projected from this long opening 83a and a projection 83b projected from the upper portion of the outer surface plate 83, there is tensioned a spring 84 by which the pin 81 is always made in slidable contact with the lower edge portion of the lock plate 75. A lock spring 85 is tensioned between an arm piece member 75c of the lock plate 75 and a projection piece member 83c projected from the lower edge portion of the outer surface plate 83 to thereby always rotate the lock plate 75 in the locking direction, that is, the direction opposite to the direction in which it is pulled to rotate by the control wire 7.

A pin 86 is protrusively attached to the arm 73. This pin 86 slidably contacts with a concave portion 87 which is formed on the upper edge portion of the base plate 72, restricting the rotational range of the arm 73. The tip end portion of the hinge pin 76 is projected to the outside through the shaft opening of the outer surface plate 83 and to which the fine adjusting knob 5a (not shown) is fixed.

The operation of this embodiment of the second angle adjusting mechanism 5 according to the present invention constructed as mentioned above will be described.

A first explanation will be given on the recovering operation in which the seat back is moved from the neutral position N to the comfortable position C or to the forward-leaning position FL and is returned to the neutral position N.

When the lever 11 of the reclining device 4 is lifted up to the intermediate stage C (refer to FIG. 3), the lock plate 75 is rotated to its intermediate position by the control wire 7 so that its elongated opening 75a pushes down the lock pin 79 of the lock gear member 78 to rotate the lock gear member 78 downward, disengaging the tip end toothed portion 78a thereof from the externally toothed annulus 74b of the intermediate gear 74, thus to release the locked state. Under this state, the arm 73 is rotatably leaned in the forward direction by the engagement between the internally toothed gear annulus 73a of the arm 73 and the externally toothed gear annulus 74a of the intermediate gear 74. This leaning in the forward direction is automatically carried out by the biasing force of the return spring 5' provided in correspondence with the second angle adjusting mechanism 5 through the intermediate portion 3b of the seat back 3.

At that time, since the pin 81 of the selector member 80 slidably contacts with the lock plate 75 in a range from its lower edge convex portion 75b to its peripheral edge, the selector member 80 is rotated upward by the biasing force of the spring 84 to make the top portion 80a thereof contact with the lower side peripheral edge portion of the arm 73 between the convex portions 73b and 73c thereof. When the arm 73 is rotated forward, the front convex portion 73b of the arm 73 is engaged with the top end portion 80a of the selector member 80, restricting the rotation of the arm 73.

Further, when the lever 11 of the reclining device 4 is lifted to the upper stage F (refer to FIG. 3), the lock plate 75 is rotated to the final position. Also in this state, the lock pin 79 of the lock gear member 78 is pushed down by the elongated opening 75a and the pin 81 of the selector member 80 is in slidable contact with the peripheral edge of the lock plate 75 so that the top end portion 80a of the selector member 80 slidably contacts with the lower edge portion of the arm 73 between its convex portions 73b and 73c. Thus, the arm 73 is released from being locked and is made turnable within a range between the convex portions 73b and 73c.

If under this state the arm 73 is lifted up, the rear convex portion 73c of the arm 73 contacts with the tip end portion 80a of the selector member 80 to thereby restrict the rotation of the arm 73. If the arm 73 is furthre leaned backward, this raises the arm 13 of the reclining device 4 from the forward-leaning state to the neutral position N through the lower portion 3a of the seat back 3 so that the arm 13 can be locked to this neutral position N. If the arm 13 of this reclining device 4 is locked, its lever 11 is rotated downward by the spring or biasing force of the lock spring 31 so that the control wire 7 is returned. Hence, the lock plate 75 of the second angle adjusting mechanism 5 is rotated to return to the original position by the biasing force of the lock spring 84 so that the arm 73 is locked at the neutral position N.

A next explanation will be given on the operation in which the seat back 3 is moved from the neutral position N to the full reclining position F or from the comfortable position C to the full reclining position F.

When the lever 11 of the reclining device 4 is lifted to the upper stage, the lock plate 75 of the second angle adjusting mechanism 5 is turned to the final position to thereby release the arm 73 from being locked as mentioned above so that the arm 73 can be pulled down to the full reclining position F.

Even when the lock plate 75 is not rotated to the its final position, in other words, even when it is rotated to its intermediate stage, the locking state of the arm 73 for the intermediate gear 74 is released. If the lever 11 of the reclining device 4 is rotated to the intermediate stage, only with respect to the second angle adjusting mechanism 5, the arm 73 can be leaned to the full reclining position F. In this case, however, the seat back 3 is not placed at the comfortable position C on the whole but merely inclined between the neutral position N and the full reclining position F, thus making the final posture of the user unstable.

Further, also in this embodiment, if the hinge pin 76 is rotated by the fine adjusting knob 5a, while the range in which the internally toothed annulus 73a of the arm 73 is engaged with the externally toothed annulus 74a of the intermediate gear 74 is moved, the arm 73 is rotated and hence its inclined angle can be varied. In this case, the turnable inclined range of the arm 73 is restricted by the engagement between the pin 86 projected on the arm 73 and the concave portion 87 formed on the upper edge of the base plate 72.

According to the present invention as described above, in the so-called multi-joint type vehicle seat in which the seat back is divided into the plurality of portions in the vertical direction, the angle adjusting mechanisms provided at the respective coupling portions can be operated by operating the single lever so that the seat back can be set to some final postures positively and varied with ease. Also, by finely adjusting each angle adjusting mechanism, the respective portions of the seat back can be changed to the state from the respective postures thus set in accordance with the taste of the user, and so it is possible to suppress the fatigue of the user as small as possible. In addition, since each angle adjusting mechanism is formed of the stepless-locking means to be operable by the rotation of the lock plate and the fine adjusting means realized by the engagement between the internally toothed gear annulus and a part of the externally toothed gear annulus, the construction thereof is simplified. Further, since the respective angle adjusting mechanisms are merely connected by the control wire, the assembling thereof is simple and the manufacturing cost thereof can be reduced. Hence, particularly when the present invention is applied to the vehicle seat, there can be achieved a great effect.

The above description is given on the preferred embodiments of the invention but it will be apparent that many modifications and variations could be effected by one skilled in the art without departing from the spirits or scope of the novel concepts of the invention so that the scope of the invention should be determined by the appended claim only.

We claim as our invention:

1. A seat for vehicles in which a seat back is separated into a plurality of portions in the vertical direction and a reclinable angle of each of said plurality of separated portions can be varied, comprising:
   (a) reclining means provided in connection with the lowest portion of said separated portions and a cushion of said seat for adjusting a reclinable angle of said lowest portion relative to said cushion of said seat;
   (b) a plurality of angle adjusting means each provided in connection with adjacent ones of said separated portions for adjusting an angle of an upper portion of said adjacent ones relative to a lower portion thereof;
   (c) fine adjusting means provided in connection with each of said plurality of angle adjusting means for finely adjusting the angle of said upper portion; and
   (d) means for coupling each of said plurality of angle adjusting means to said reclining means to thereby operate said plurality of angle adjusting means in response to each operation of said reclining means, whereby said separated portions can be varied to various reclinable postures and said reclined postures of said separated portions can be adjusted finely.

2. A seat for vehicles according to claim 1, in which said reclining means comprises a first angle adjusting mechanism for adjusting an angle of a first separated portion of said lowest portion relative to said seat cushion, said first angle adjusting mechanism comprising:
   a movable arm for supporting said first separated portion;
   a supporting member for rotatably supporting said movable arm;
   said fine adjusting means including an operation handle and a gear member;
   angle adjusting range restricting means of said movable arm;
   a lock mechanism engaged with said fine adjusting means and said angle adjusting range restricting means;
   an operation lever coupled with said lock mechanism; and biasing means for biasing said first separated portion forward.

3. A seat for vehicles according to claim 2, in which said first angle adjusting mechanism includes a rotation pattern to reclinably rotate said first separated portion to a forward-leaning position, a neutral position, a comfortable position and a full reclining position relative to said seat cushion in this order.

4. A seat for vehicles according to claim 1, in which said plurality of angle adjusting means include rotation patterns to reclinably rotate corresponding seperated portions to a forward-leaning position, a comfortable position, a neutral position and a full reclining position along the front and rear direction of said seat in this order.

5. A seat for vehicles according to claim 1, in which said separated portions are provided with said plurality of angle adjusting means in connection with said first angle adjusting mechanism, each of said plurality of angle adjusting means comprising:
- a movable arm for supporting a corresponding separated portion;
- a supporting member for rotatably supporting said movable arm;
- said fine adjusting means including an operation handle and a gear member;
- angle adjusting range restricting means of said movable arm;
- a lock mechanism engaged with said fine adjusting means and said angle adjusing range restricting means;
- means for locking-on a corresponding separated portion at a neutral position from a forward-leaning position skipping a comfortable position along the front and rear direction of said seat; and
- biasing means for biasing a corresponding separated portion forward.

6. A seat for vehicles according to claim 5, in which said locking-on means is formed of a neutral plate member, a spring member and a hook member.

7. A seat for vehicles according to claim 1, in which said coupling means for coupling each of said plurality of angle adjusting means to said reclining means is formed of a wire member.

8. A seat for vehicles according to claim 2, in which said fine adjusting means, movable arm, angle adjusting range restricting means and lock mechanism in said first angle adjusting mechanism are provided around the same rotary shaft.

9. A seat for vehicles according to claim 5, in which said fine adjusting means, movable arm, angle adjusting range restricting means, lock mechanism and locking-on means in said plurality of angle adjusting means are provided around the same rotary shaft.

10. A seat for vehicles according to claim 2, in which said lock mechanism in said first angle adjusting mechanism comprises a first lock member having at its one end portion a toothed portion engaged with said gear member of said fine adjusting means and a pin, a second lock member integrally coupled with said operation lever, said second lock member having bored therethrough an elongated opening into which said pin of said first lock member is inserted, and a third lock member having a first engaging portion engaged with said angle adjusting range restricting means and a second engaging portion engaged with a lower end portion of said second lock member.

11. A seat for vehicles according to claim 5, in which said lock mechanism in said plurality of angle adjusting means comprises a first lock member having at its one end portion a toothed portion engaged with said gear member of said fine adjusting means and a pin, a second lock member having bored therethrough an elongated opening into which said pin of said first lock member is inserted, and a third lock member having a first engaging portion engaged with said angle adjusting range restricting means and a second engaging portion engaged with a lower end portion of said second lock member.

12. A seat for vehicles according to claim 10, in which said elongated opening of said second lock member in said first angle adjusting mechanism is formed to have a step.

13. A seat for vehicles according to claim 11, in which said elongated opening of said second lock member in said plurality of angle adjusting means is formed to have a step.

14. A seat for vehicles according to claim 2, in which said angle adjusting range restricting means in said first angle adjusting mechanism is formed of a disc-shape plate, said disc-shape plate having partly formed on its outer periphery a concave portion and a protrusion which define an angle adjusting range of said movable arm.

15. A seat for vehicles according to claim 5, in which said angle adjusting range restricting means in said plurality of angle adjusting means is formed of a disc-shape plate, said disc-shape plate having formed on its outer periphery a first concave portion and a protrusion which define an angle adjusting range of said movable arm, said first concave portion having formed at its one end a second concave portion which is deeper than said first concave portion.

16. A seat for vehicles according to claim 2, in which said biasing means in said first angle adjusting mechanism is formed of a return spring.

17. A seat for vehicles according to claim 5, in which said biasing means in said plurality of angle adjusting means is formed of a return spring.

18. A seat for vehicles according to claim 1, in which each of said plurality of angle adjusting means prepared for each of said separated portions comprising:
- (a) a movable arm for supporting a corresponding separated portion;
- (b) first and second supporting members for rotatably supporting said movable arm at both surfaces, said second supporting member having an elongated opening bored through its lower portion;
- (c) said fine adjusting means having a gear member provided between said first and second supporting members and an operation handle coupled with said gear member from the outside;
- (d) angle adjusting range restricting means for said movable arm formed of a first concave portion formed on an upper end of said first supporting member and a second concave portion formed on a lower end of said movable arm;
- (e) a lock mechanism comprising:
  - (i) a first lock member having a toothed portion engaged with said gear member and a pin extended in the lateral direction and pivoted between said first and second supporting members;
  - (ii) a second lock member having at its one end a tip end poriton which contacts with said second concave portion of said movable arm and having substantially at its center a pin which is inserted into an elongated opening of said second supporting member; and
  - (iii) a third lock member having at its upper portion a pivot portion which is pivoted on the same rotary shaft on which said gear member and said movable member are pivoted and having formed through its lower portion an elongated opening into which said pin of said first lock member is inserted; and
- (f) a pin implanted on said movable arm so as to contact with said first concave portion of said first supporting member.

19. A seat for vehicles according to claim 18, in which said gear member is formed of an internally toothed gear portion formed on said movable member around a shaft opening of said movable arm, an externally toothed gear portion having less teeth than said internally toothed gear portion and an intermediate gear member having an externally toothed portion having an outer diameter larger than said externally toothed gear portion and said internally toothed gear portion and said externally toothed gear portion are constructed in an eccentric state, whereby said movable arm and said intermediate gear member can vary a mutual angle therebetween in a stepless fashion by a pin inserted through the shaft openings of said internally toothed gear portion and said externally toothed gear portion.

20. A seat for vehicles according to claim 19, in which said elongated opening of said third lock member is formed to have a step.

* * * * *